United States Patent [19]

Constable

[11] Patent Number: 5,729,774
[45] Date of Patent: Mar. 17, 1998

[54] LOW COST MOTORIZED CAMERA WITH FLASH CONTROL CIRCUIT

[75] Inventor: Douglas W. Constable, Rochester, N.Y.

[73] Assignee: Eastman Kodak Company, Rochester, N.Y.

[21] Appl. No.: 779,552

[22] Filed: Jan. 8, 1997

[51] Int. Cl.$^6$ ............................................. G03B 7/26
[52] U.S. Cl. ............................................ 396/206; 396/302
[58] Field of Search ........................... 396/205, 206, 396/301, 302, 303

[56] References Cited

U.S. PATENT DOCUMENTS

| | | | |
|---|---|---|---|
| 4,220,407 | 9/1980 | Stemme et al. | 396/205 |
| 4,273,432 | 6/1981 | Matsuda et al. | 396/205 |
| 4,426,144 | 1/1984 | Kawazoe | 396/205 |
| 4,509,843 | 4/1985 | Hasegawa | 396/303 |
| 4,566,769 | 1/1986 | Inoue | 396/205 |
| 5,309,195 | 5/1994 | Goo et al. | 396/302 |

Primary Examiner—Russell E. Adams
Attorney, Agent, or Firm—Francis H. Boos, Jr.

[57] ABSTRACT

In a single use camera having a flash circuit and a film drive motor operated from a single battery source, a control circuit is provided with a diode that is coupled from a terminal on the motor control switch to the flash charging circuit to suppress operation of the flash charging circuit while the film drive motor is operating to advance the film after a picture taking event. The motor OFF position of the control switch is connected to battery positive terminal and the control circuit includes a capacitive connection from the switch to the flash charging circuit such that when the motor switch changes over from the motor ON to motor OFF position, a positive pulse is applied to restart operation of the flash charging circuit when the motor is turned off. This arrangement suppresses operation of the flash charging circuit while the motor is running, allowing full battery current to be applied to the motor. The control circuit is not a part of the primary flash charging circuit path thus it does not adversely affect the charging cycle time.

9 Claims, 2 Drawing Sheets

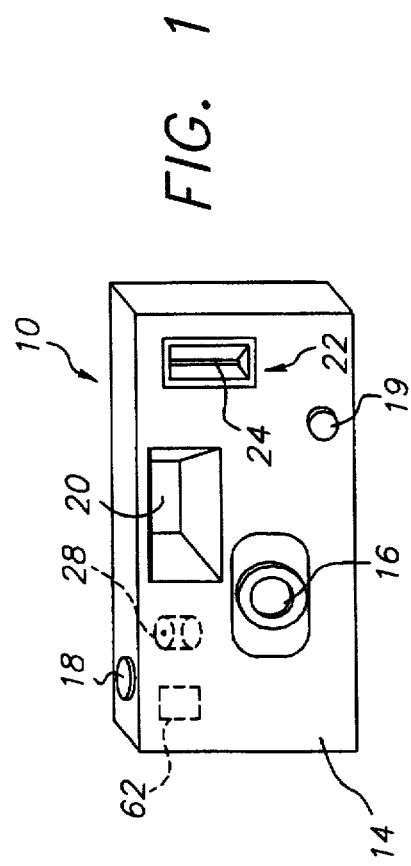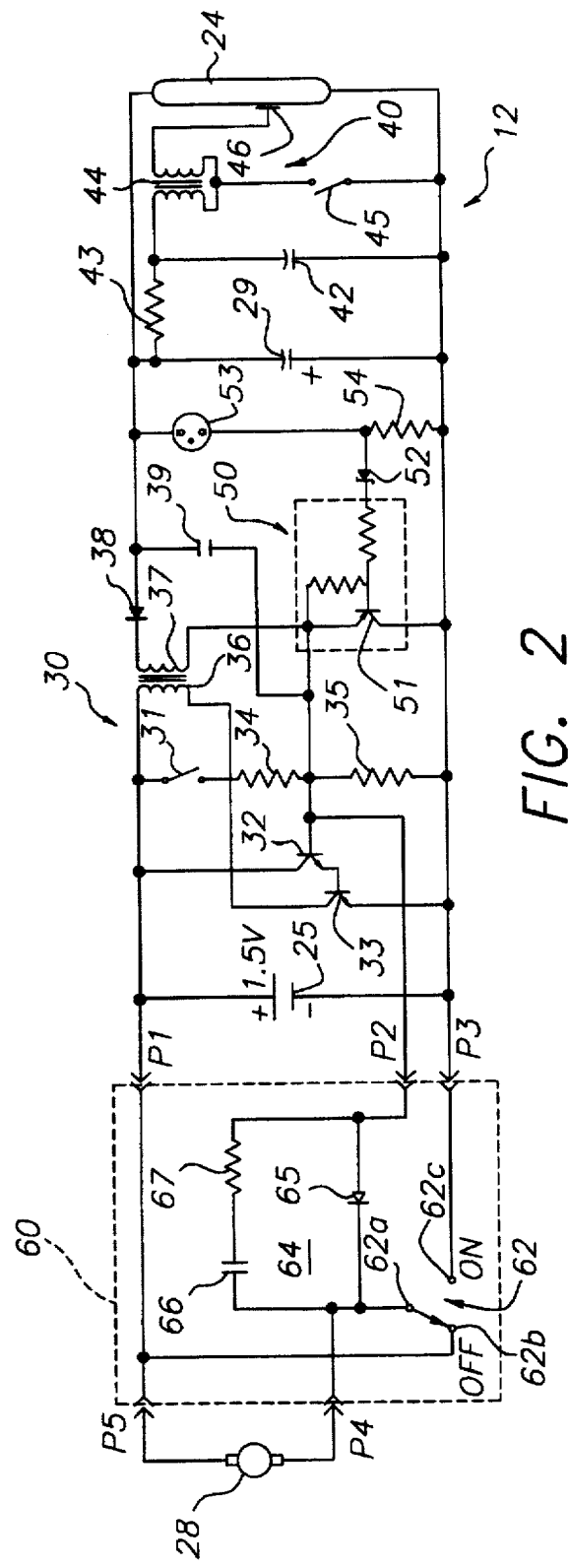

LOW COST MOTORIZED CAMERA WITH FLASH CONTROL CIRCUIT

FIELD OF THE INVENTION

This invention relates generally to the field of photographic cameras, and in particular to cameras that employ a single energy source for powering both an auto-restart type of flash charging circuit and a film drive motor.

BACKGROUND OF THE INVENTION

In commonly assigned U.S. Pat. No. 5,574,337, a one touch flash charging ciruit for a single use camera conserves battery energy by stopping flash charging oscillations in response to a sensed fully charged condition of the flash capacitor. After each picture taking operation, flash charging oscillation is automatically restarted by energy feedback from the flash illumination circuit. Stopping flash charging once the flash capacitor reaches full charge is of particular significance in a single use camera due to the fact that the battery is inaccessible to the camera user and thus cannot be replaced if the battery runs down in the middle of a picture taking sequence. The automatic restart feature is highly useful since it ensures the availability of flash when a picture taking opportunity arises and avoids disappointment caused by forgetting to restart the flash charging circuit in advance of the opportunity and then having to wait ten seconds of so for the flash capacitor to recharge.

With increasing popularity of single use cameras, it becomes desirable to provide additional convenience features such as motorized film drive to meter the positioning of unexposed frame areas of the film in the frame exposure portion of the camera. Japanese Patent Application Publication 8-69040A—Tobioka et al. and commonly assigned U.S. Pat. No. 5,574,524—Petruchik show single use cameras with motor drive control switch arrangments mechanically interconnected with the shutter release mechanism. The arrangements are such that when the shutter is closed at the conclusion of picture taking, the film drive motor switch is closed to turn the motor on to begin a film metering operation that advances the film to the next available unexposed film frame. When proper positioning of the film is sensed, the motor switch is opened to turn the motor off thereby completing the film metering operation.

Due to the compact and low cost nature of a single use camera, it is necessary, as a practical matter, to operate the camera from a single battery energy source. Typically, this is small 1.5 volt battery. The flash charging circuit is automatically restated immediately following a flash picture. If the metering motor operates simultaneously with the flash charger, the current drain on the battery is significant and can result in erratic operation of the film metering motor with possible mis-positioning of the film. To avoid this result, it is desirable to suppress operation of the flash charging circuit until the film metering operation is completed.

U.S. Pat. No. 4,112,444 Yonemoto et al. shows a flash charging circuit in a camera that also employs an optical data recording circuit to expose day/date information on film as part of a picture taking operation. Both circuits are operated from a single battery energy source. The flash charging circuit is of the type that is normally always on in a flash circuit, no provision being made to stop the charging mode when the flash capacitor is fully charged. A two pole ganged switch has one set of switch contacts in the flash charging circuit which is used to manually disconnect the flash circuit from the battery source when the data recording circuit is connected across the battery. However, a bypass transistor is coupled across the flash circuit switch contacts and is controlled from the data circuit to maintain the battery connection to flash circuit as long as the data circuit is not operating to record the day/date information on the film. When a picture is taken and the data circuit begins to expose day/date information on the film, the data circuit turns the bypass transistor off thereby disconnecting the flash circuit from the battery to prevent flash charging for the duration of the day/date exposure operation. At the conclusion of the day/date exposure operation, the bypass transistor is biased to its on state thereby reconnecting the flash circuit to the battery for normal flash charging operation. Such a continuously on flash circuit is not suitable for use in a single use camera, as noted above. It also requires the use of additional, relatively costly ganged switches to select between data circuit on and off operation. Moreover, the use of manually operated on/off switch contacts in the battery charging circuit has the disadvantage that the switch contact resistance undesirably increases flash capacitor charging time. Similarly, the collector-emitter saturation voltage drop of the bypass transistor in the flash charging circuit also increases recycle charging time.

SUMMARY OF THE INVENTION

It is an object of the present invention to provide a simple means for holding a flash charging circuit off during operation of a film drive motor during a film metering operation.

It is another object of the invention to provide a simple and effective means for restarting a single touch flash charging circuit when the film drive motor is turned off at the conclusion of a film metering operation.

It is a further object of the invention to provide a simple and low cost means for interfacing a film drive motor circuit with a single touch flash charging circuit.

It is yet another object of the invention to provide an interface arrangement for a one touch flash charging circuit that makes the flash charging circuit readily adaptable for use in either a motorized or non-motorized single use camera with a minimum modification.

These objects are met in accordance with the invention by the provision of a photographic camera that comprises a flash circuit which includes a flash illumination circuit, having a flash capacitor therein, and a self oscillating flash charging circuit which is responsive to momentary applied energy to initiate oscillations therein for charging of the flash capacitor and which is adapted to sustain such oscillations after removal of applied energy. The camera of the invention also includes a film drive motor and a motor control switch for controlling operation of the film drive motor, the switch having a motor ON position and a motor OFF position. The camera further includes control circuit means, coupled to the switch and the flash charging circuit, the control circuit being responsive to the switch when in the motor ON position for preventing the charging circuit from initiating self oscillations in response to any momentary applied energy and is responsive to changeover of said motor control switch from the motor ON to the motor OFF position to provide momentary energy to the flash charging circuit to initiate said self oscillations therein.

In a particularly preferred aspect of the invention, the flash charging circuit includes an oscillation transistor having a base terminal to which momentary energy is applied to initiate oscillation and which is also coupled to an oscillation feedback path for maintaining self oscillation after the momentary energy source is removed. The control circuit means includes a diode connected from the base terminal to the motor control switch such that when the motor control switch is in the ON position, the diode shunts feedback current away from the oscillator transistor base to inhibit flash charging operation while the drive motor is operating. The control circuit means further includes a capacitive connection from the control switch to the oscillating transistor base terminal such that when the motor control switch changes over to the OFF position momentary energy is supplied via the capacitive connection to the transistor base terminal to initiate self sustaining oscillations in the flash charging circuit. Advantageously, the control circuit means are separate from, i.e. not a part of the primary flash charging circuit path and therefore does not affect the charging recycle time.

These and other aspects, objects, features and advantages of the present invention will be more clearly understood and appreciated from a review of the following detailed description of the preferred embodiments and appended claims, and by reference to the accompanying drawings.

BRIEF DESCRIPTION OF THE DRAWINGS

In the drawings:

FIG. 1 is a perspective illustration of a camera embodying the present invention; and FIGS. 2–4 are circuit schematics illustrating alternative embodiments of flash apparatus and film drive motor control in accordance with the present invention.

DETAILED DESCRIPTION OF THE INVENTION

Figure 3:
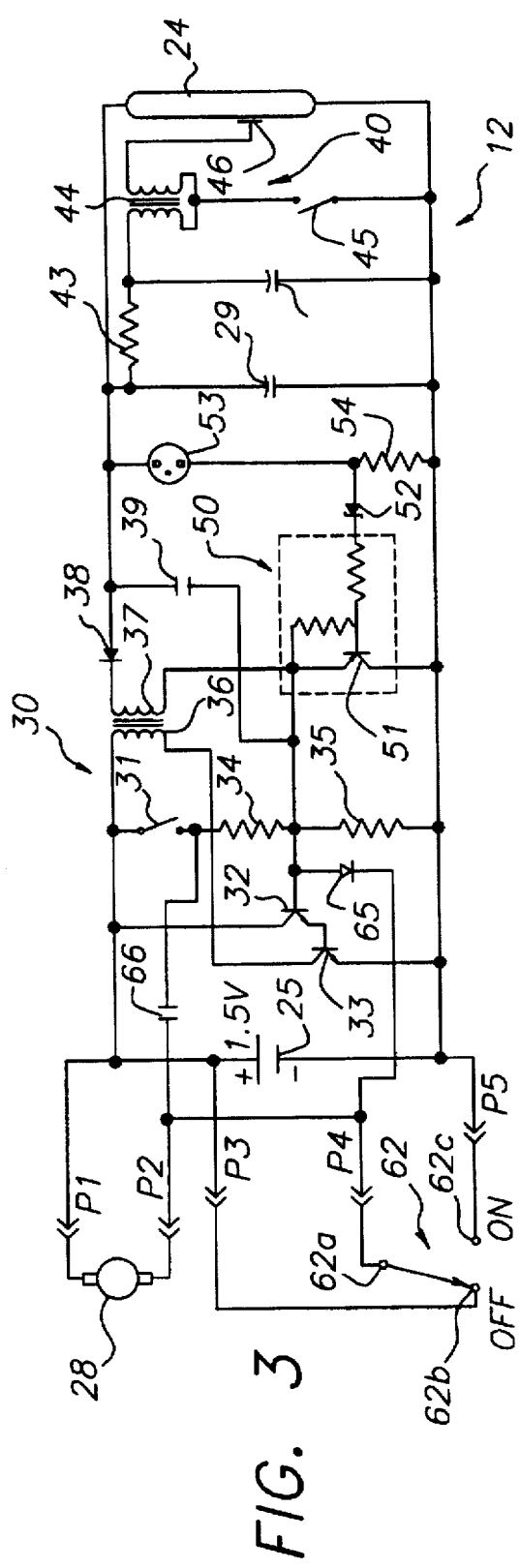

Referring to FIG. 1, there is depicted an inexpensive, single use camera 10 including a body 14, an optical system 16, two actuating mechanisms 18 and 19, a viewfinder 20 and a flash device 22 including a flash tube 24. A film drive motor 28 mounted in camera body 14 is adapted to operate in known manner to advance and position ("meter") photographic film (not shown) into a predetermined exposure position relative to the other camera components in well known manner. Shutter button 18 initiates a sequence which opens and closes a shutter to expose the film through optical system 16 with supplemental illumination from flash device 22. Upon closing of the shutter, a film drive motor control switch 62 is actuated to activate drive motor 28 to move the film to position an exposed frame of the film into the exposure position in preparation for taking of the next picture. A "one-touch" button 19, operable by the camera user, initiates a flash charging cycle prior to the exposure sequence. The camera is pointed at the intended subject with the aid of viewfinder 20.

Turning now to FIG. 2, there is shown an arrangement in accordance with the invention in which an auto-restart flash circuit 12 and film drive motor 28 are operated from a single battery source 25. As shown therein, flash circuit 12 includes a self-oscillating flash charging circuit 30, a flash capacitor 29, a flash trigger circuit 40 and a flash tube 24. The flash circuit 12 also includes an oscillation arresting circuit 50, a resistor 35 and a capacitor 39, the latter serving the dual functions of oscillator efficiency enhancement and as a feedback path for enhanced feedback of energy from the flash trigger circuit to restart flash operation of the flash charging circuit when a flash picture is taken. Flash circuit 12 is preferably mounted on a single printed circuit board for compact mounting within the single use camera 10. These circuits are described more fully in commonly assigned U.S. Pat. No. 5,574,337—Dunsmore and copending application Ser. No. 08/575,658—Constable, the disclosures of which are incorporated herein by reference. Briefly, self oscillating charging circuit 30 includes first and second ganged oscillating transistors 32,33 and a step up oscillation transformer having primary and secondary windings 36,37. A manually operated momentary switch 31 closed by depression of button 19 on camera 10 is coupled from the positive terminal of battery 25 via a resistor 34 to the base of first oscillation transistor 32 such that when switch 31 is closed, a positive potential is applied to the base of transistor 32 turning on both transistors 32 and 33 to initiate oscillatory pulses through primary winding 36. These pulses are stepped up in the secondary winding 37 and rectified in diode 38 to charge flash capacitor 29. Feedback current from the secondary winding 37 sustains the oscillatory condition even when switch 31 is released, removing the positive bias potential from the base of transistor 32.

The flash triggering circuit 40, is used in commercially available single use cameras, and will not be described in detail. Briefly, however, the circuit 34 includes an isolation resistor 43, a triggering capacitor 42, a voltage converting transformer 44, a flash triggering electrode 46 and a synchronizing switch 45. Triggering capacitor 42 is charged by current flow through secondary winding 37 at the same time and in similar manor as flash capacitor 29. In operation, synchronizing switch 45 is closed by the camera shutter mechanism at the proper time in the exposure sequence. Capacitor 42 discharges through the primary winding of voltage converting transformer 44, inducing a high voltage pulse of about 4.0 kilovots in the secondary winding which is applied to triggering electrode 46 causing ionization of the gas in flash discharge tube 24. Flash capacitor 29 then discharges through the flash tube 24, exciting the gas and producing flash illumination.

During charging, the voltage level on flash capacitor 29 reaches an initial level of about 270 volts. At this point, neon ready light 53 begins to conduct, illuminating the ready light and informing the user there is sufficient charge on flash capacitor 29 to initiate the a flash exposure sequence. When the neon ready light begins to conduct, the voltage across it drops to about 220 volts and the balance appears across high value resistor 54. Charging continues until the charge on capacitor 29 reaches a level of about 330 volts. At this point, the voltage across resistor 54 is about 110 volts. A voltage arresting circuit 50, including a 110 volt zener diode 52 and bi-level transistor 51, is coupled from the common terminal of neon ready light 53 and resistor 54. When the flash capacitor 29 is at 330 volt charge, zener diode 53 begins to conduct, applying momentary current to the base of transistor 51. This turns switching transistor 51 on, which grounds the base of oscillation transistor 32. This shunts the feedback from transformer secondary winding 37 therby arresting any further self oscillations in charging circuit 30. Transistor 32 remains off until applied energy at the base terminal causes the transistor to reinitiate conduction.

While restarting of the flash charging circuit can be initiated at any time by manual depression of momentary switch 31, an advantage of the particular circuit shown is that automatic restart is enabled by virtue of feedback of energy generated by triggering of the flash tube 24. The energy feedback via the secondary winding 37 in most cases is sufficient to drive transistor 32 into conduction thereby restarting the self oscillatory process. As will be discussed below, the provision of capacitor 39 coupled from flash capacitor 29 to the base of transistor 32 enhances the feedback and improves the reliability of the automatic restart operation.

A resistor 35 is connected between the base of transistor 32 and ground and serves to prevent the oscillation circuit from commencing charging when exposed to static electricity. Resistor 35 holds the base of transistor 32 at ground potential until switch 42 is momentarily closed. Thus static electricity that would otherwise flow through the junctions of transistors 32 and 33 does not start the charger. The value of resistor 35 relative to that of resistor 34 is chosen to ensure that the bases of transistors 32 and 33 are forward biased when switch 31 is closed. A small valued capacitor 39, on the order of 200 pf to 1000 pf, preferably 470 pf, provides filtering on the base of transistor 32 to keep the oscillation circuit from inadvertently turning on in response to undesirable signal noise caused by, for example, battery bounce or the neon ready light turning off.

While capacitor 39 may be coupled directly across resistor 35 between the base of transistor 32 and ground, it is preferred that it be coupled as shown between the base and the flash capacitor 29. When the flash capacitor is fully charged and the camera is left idle for two or three hours, the charge on the flash capacitor can bleed down to 250 volts. When the camera flash is operated under this condition the feedback may be sufficiently low that it is absorbed by resistor 35 and the flash charging circuit may fail to restart. By connecting the capacitor 39 directly to the flash capacitor, the feedback of energy to restart the charger is enhanced while the desired effect of filtering to prevent accidental restart (e.g. battery bounce) is retained since the capacitor provides the requisite connection to AC ground through the flash capacitor.

It should be noted that the automatic restart operation as described above begins immediately with triggering of the flash tube 24. In a non-motorized single use camera, this is a highly effective method of operation of the flash recharging operation. However, in a motorized camera, it becomes a problem since the motor must compete with the flash charging circuit for battery current. Film drive motor 28 is mounted appropriately within the camera and is turned ON and OFF by means of a two position motor control switch 62 which, in this case, is mounted on a printed wiring board 60 separate from that used for the flash circuit 12. This has advantages in camera recycling operations in that the flash circuit board may be used, without modification, in either a motorized or non-motorized single use camera. The common terminal 62a of motor control switch 62 is coupled via board connector P4 to one terminal of motor 28. The other terminal of motor 28 is coupled via board connectors P5 and P1 to the positive terminal of battery 25. The motor OFF terminal 62b is also coupled to the battery terminal positive terminal via board connector P1. The motor ON terminal 62c is coupled via board connector P3 to the negative terminal of battery 25. Actuator means (not shown) is used to control movement of the switch between the ON and OFF positions in well known manner such as is described in each of the above referenced disclosures.

In addition to the motor control switch 62, board 60 is provided with control circuit means 64 coupled from the common terminal 62a of motor control switch 62 via board connector P2 to the base of oscillation transistor 32 in the flash charging circuit 30. Circuit means 64 includes a feedback shunting diode 65 and a capacitive circuit including capacitor 66 in series with resistor 67; both coupled in parallel with diode 65.

In operation, when the shutter button 18 is depressed to take a picture, the motor control switch is in the OFF position at terminal 62b. The flash charging is assumed to have been previously turned off by operation of the feedback circuit 50 at the conclusion of a prior flash charging operation. Actuation of the shutter button 18 closes sync switch 45 to initiate the triggering of flash illumination from flash tube 24. Energy feedback through capacitor 39 restarts the flash charging circuit as described above. At the conclusion of the exposure sequence, the motor control switch is changed over to the motor ON position 62c by mechanical means (not shown) as described in the aforementioned disclosures. Moving the switch to the motor ON position connects the P4 terminal of motor 28 to the negative terminal of battery 25 thereby applying full battery potential to the motor. Simultaneously, diode 65 is connected from the base of transistor 32 to ground, i.e. the common connection to the negative side of battery 25, thereby shunting all feedback current away from transistor 32. This shuts down the flash charging circuit and eliminates the current drain on the battery that would otherwise be caused by operation of the charging circuit and thereby allowing full battery power to be applied to the drive motor. Once the film metering sensor (not shown) determines that the film has been advanced to place an unexposed frame in the exposure position, the movable pole of switch 62 changes back to OFF terminal 62b which is connected to the positive terminal of battery 25. This injects a positive pulse into the base of transister 32 which restarts the charging operation in the following manner. While switch 62 is in position 62c during film metering, capacitor 66 and resistor 67 are connected from the base of transistor 32 to ground. Resistor 67 prevents capacitor 66 from undesirably shunting the oscillator feedback away from the base of of transistor 32. When switch 62 returns to position 62b at the conclusion of film metering, capacitor 66 is disconnected from ground and is connected to the positive side of battery 25. Capacitor 66 then charges toward the battery voltage through resistor 67 and the base of transistor 32 which restarts the charging operation. Thus, with the arrangement described, the flash charging circuit is held off by the shunting effect of diode 65 as long as the motor 28 is running and the flash charging circuit is automatically restarted when the motor is turned off. Since the motor control switch is separate from, i.e. not part of the primary flash charging circuit, it has no adverse affect on the timing cycle of the charging operation.

Turning now to FIG. 3, an alternative embodiment of the invention is shown in which the flash circuit is the same as shown in FIG. 2 in which like components bear the same reference numerals. The difference between the two circuits is that the separate mounting board is eliminated. The motor control control switch is mounted independently in the camera preferably as part of the shutter operated mechanism set forth in the above mentioned disclosures and capacitor 66 is mounted directly on the flash circuit board. Additionally, capacitor 66 is connected to the upper end of resistor 34 which eliminates the need for a separate resistor 67. While this arrangement requires the addition of a diode and capacitor to the flash circuit board to make the board adaptible for use in either motorized or non-motorized single use cameras, it does allow a single board design to be employed in the overall camera recycling stream.

Figure 4:
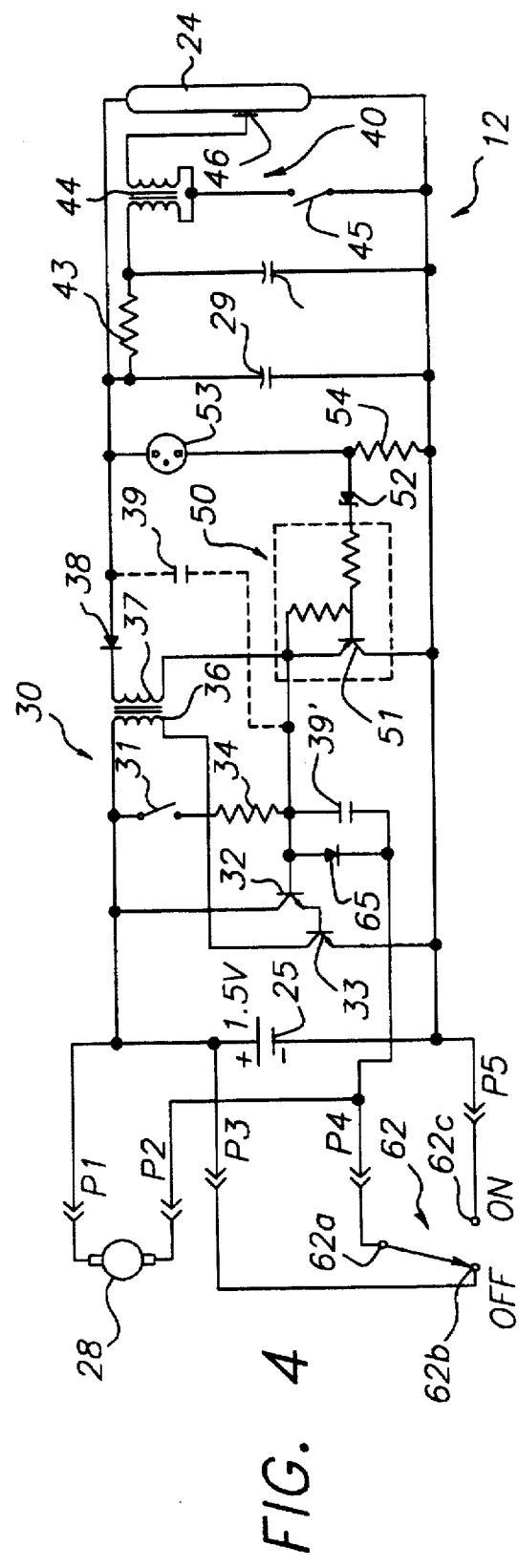

FIG. 4 shows a further alternative embodiment of the invention which employs a slight board modification that reduces the parts count and customizes the board for use as either a motorized camera flash board or as a non-motorized camera flash board. In this arrangement, the flash circuit is essentially the same as shown in FIGS. 2 and 3 with like compnonents bearing the same reference numerals except that provision is made for placement of feedback capacitor 39 in either its original position as shown in dotted line on the drawing or in position shown in solid line by reference numeral 39' connected directly from the base of transistor 32 to terminal 62a of motor control switch 62. Since the purpose of connecting capacitor 39 to the flash capacitor is to enhance energy feedback to automatically restart the flash charging circuit, and since this function is superfluous when the board is used in a motorized camera, the same capacitor can be moved to the position 39' for restarting of the flash charging circuit from movement of switch 62 at the conclusion of film metering, thus saving the parts cost of additional capacitor 66 used in the embodiments of FIGS. 2 and 3. It is only necessary to provide alternative terminal holes in the board to allow the capacitor to be placed in a selected one of the two positions depending on whether the board is to be used in a motorized or non-motorized camera.

The invention has been described with reference to a preferred embodiment. However, it will be appreciated that variations and modifications can be effected by a person of ordinary skill in the art without departing from the scope of the invention.

PARTS LIST 10 camera
12 flash circuit
14 camera body
16 optical system
18 shutter button
19 "one touch" charger button
20 viewfinder
22 flash device
24 flash tube
25 battery
28 film drive motor
29 flash charge storage capacitor 160 µf
30 self oscillating flash charging circuit
31 "one touch" charge start switch
32 oscillation transistor
33 oscillation transistor
34 resistor 10 K
25 resistor 220 K
36 oscillation transformer primary winding
37 oscillation transformer secondary winding
38 charge rectifier diode
39 capacitor 470 pf
40 flash trigger circuit
42 flash trigger capacitor 0.022 µf
43 trigger circuit isolation resistor 1 Meg
44 voltage converting transformer
45 flash trigger switch
46 flash tube triggering electrode
50 oscillator arresting circuit
51 switching transistor
52 zener diode
53 neon tube
54 resistor 3.9 Meg
60 motor control circuit board
62 film drive motor control switch
64 control circuit means
65 oscillation shunt diode
66 capacitor 0.1 µf
67 resistor 10 K

What is claimed is:

1. A photographic camera comprising:
   a flash circuit including a flash illumination circuit, having a flash capacitor, and a self oscillating flash charging circuit responsive to momentary applied energy to initiate oscillations therein for charging of said flash capacitor and adapted to sustain such oscillations after removal of said applied energy;
   a film drive motor;
   a motor power control switch for controlling operation of the film drive motor, the switch having a motor ON position and a motor OFF position; and
   control circuit means, coupled to said switch and said flash charging circuit, responsive to said switch in the motor ON position for preventing said charging circuit from initiating self oscillations in response to any momentary applied energy and responsive to changeover of said motor control switch from the motor ON to the motor OFF position to provide momentary energy to the flash charging circuit to initiate said self oscillations therein.

2. The camera of claim 1 wherein said flash circuit includes feedback means for initiating oscillations in said flash charging circuit in response to discharge of said flash capacitor; and said control circuit means is operative to prevent said feedback means from initiating oscillations in said charging circuit while said motor control switch is in the motor ON position.

3. A photographic camera having a shutter actuating mechanism for opening and closing a film exposure shutter comprising:
   a single source of battery energy;
   film metering apparatus including a drive motor and a motor control switch having motor ON and motor OFF positions;
   flash apparatus including a flash illumination circuit having a flash capacitor and a self oscillating flash capacitor charging circuit normally responsive to momentary applied energy for initiating self oscillations which are sustained after removal of said momentary applied energy;
   a unidirectional conduction device coupled between said motor control switch and said charging circuit for suppressing oscillations in the charging circuit in the presence of any applied momentary energy that would normally initiate oscillation in the charging circuit; and
   momentary energy transfer means coupled to said switch and said charging circuit and responsive to changeover of said switch from a motor ON position to a motor OFF position for applying momentary energy directly to said charging circuit for initiating oscillations upon conclusion of film metering.

4. A photographic camera having photoflash means and film metering means powered by a common energy source, the film metering means including a film drive motor and a film metering motor power control switch having motor ON and motor OFF states, comprising:
   a self oscillating flash charging circuit included in said photoflash means and having a primary oscillation current circuit path; and
   charging circuit control means coupled to said film metering control switch and being separate from said primary oscillation current circuit path for controlling initiation of oscillations in said self oscillating charging circuit.

5. The camera of claim 4, said charging circuit control means being responsive to said film metering control switch in the motor ON state for suppressing initiation of oscillations in said charging circuit and being responsive to changeover from the motor ON state to the motor OFF state for supplying momentary energy to said charging circuit for initiating oscillations.

6. The camera of claim 4, said primary oscillation current circuit path comprising a stepup oscillation transformer having primary and secondary windings and oscillating transistor means having one output terminal coupled to a first terminal of said common energy source and another output terminal coupled through said transformer primary winding to a second terminal of said common energy source; said oscillating transistor means having a base input terminal coupled to said secondary winding for receiving feedback current for sustaining oscillations in said charging circuit; said charging circuit control means including a unidirectional current conduction device coupled between said film metering motor power control switch and said transistor base input terminal and responsive to said switch in a motor ON state to shunt current from said base input terminal to prevent said self oscillations.

7. The camera of claim 6 wherein said charging circuit control means includes momentary energy supply means responsive to changeover of said film metering motor power control switch from a motor ON state to a motor OFF state to supply momentary energy from said common energy source directly to said base input terminal to initiate said self oscillations.

8. The camera of claim 7 wherein said momentary energy supply means comprises a series circuit of a capacitor and a current limiting resistor coupled from said film metering control switch to said base input terminal.

9. The camera of claim 7 wherein said self oscillating charging circuit includes a series connected manually operated momentary switch and current limiting resistor coupled from a terminal of said common energy source to said base input terminal operative to initiate oscillations in said charging circuit which are self sustaining after release of said momentary switch; and said momentary energy supply means comprises a capacitor coupled from said film metering switch to said current limiting resistor.

* * * * *